United States Patent [19]
Belcourt
[11] 4,168,926
[45] Sep. 25, 1979

[54] LEVER DEVICE FOR POWER DRILL

[76] Inventor: Rudolph Belcourt, 1509 8th Ave. South, Grand Forks, N. Dak. 58201

[21] Appl. No.: 865,847
[22] Filed: Dec. 30, 1977
[51] Int. Cl.[2] .......... B23B 47/00
[52] U.S. Cl. .......... 408/92; 408/111
[58] Field of Search .......... 408/87, 92, 99, 111; 137/318

[56] References Cited

U.S. PATENT DOCUMENTS

| | | | |
|---|---|---|---|
| 1,097,709 | 5/1914 | Fosselman | 408/92 |
| 2,695,525 | 11/1954 | Butenhoff | 408/92 X |
| 2,821,872 | 2/1958 | Salfer | 408/92 |
| 3,248,973 | 5/1966 | Meyer | 408/92 |
| 3,784,315 | 1/1974 | O'Brian | 408/92 |
| 3,821,965 | 7/1974 | Reynolds | 137/418 |

FOREIGN PATENT DOCUMENTS

| | | | |
|---|---|---|---|
| 232684 | 5/1910 | Fed. Rep. of Germany | 408/92 |
| 846277 | 9/1939 | France | 408/92 |

*Primary Examiner*—John Sipos
*Attorney, Agent, or Firm*—Robert E. Kleve

[57] ABSTRACT

This invention comprises a leverage attachment for a power drill having a grip. The leverage attachment has a bracket for mounting to the housing of the power drill. A lever arm is pivotally mounted at one end to the bracket. The lever arm has an eyelet adjustment to the pivotal mounting of the arm. A link chain is mounted at one end to the eyelet of the device and is adapted to extend around the material to be drilled. The device has a hook connected to the one end of the chain and adapted to be hooked to one of the links of the other end of the chain to position the chain taunt about the material when the drill is in position upon the material for drilling, so that the operator may with one hand push upon the grip of the power drill and energize the drill and with the other hand push the lever arm upward to push the drill downward relative to the chain and thereby to push the drill bit of the drill downward upon the material to provide additional downward leverage force upon the drill bit in engaging the material.

1 Claim, 3 Drawing Figures

LEVER DEVICE FOR POWER DRILL

This invention relates to leverage attachments for power drills.

It is an object of the invention to provide a novel attachment device for power drills which will provide additional downward leverage force upon the power drill to assist in drilling through materials.

It is another object of the invention to provide a novel attachment for a power drill which can be easily operated and easily adjusted to different thicknesses of material to provide additional leverage force for drilling through material.

Further objects and advantages of the invention will become apparent as the description proceeds and when taken in conjunction with the accompanying drawing wherein.

Briefly stated, the invention comprises a leverage attachment device for power drills having a bracket adapted to be mounted to the housing of a power drill, the lever is pivotally mounted to the bracket. The lever arm has a dependent plate portion spaced away from the pivotal mounting and has a mounting eyelet in the plate portion. A link chain has one end attached to the eyelet and is adapted to be extended about the material to be drilled. A hook is provided which is adjustably attached between the outer end of the chain and the one end of the chain in a taunt position when the drill is in operative position for drilling through the material whereby the upward movement of the lever will provide additional downward force upon the drill and the drill bit to assist in drilling through the material.

Figure 1:
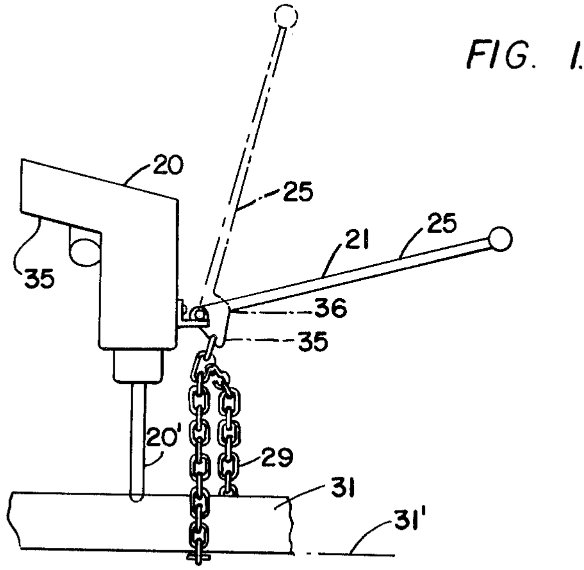
FIG. 1 is a side elevational view of the leverage attachment device shown attached to a power drill and in operative position for providing additional leverage for drilling through material.
Figure 2:
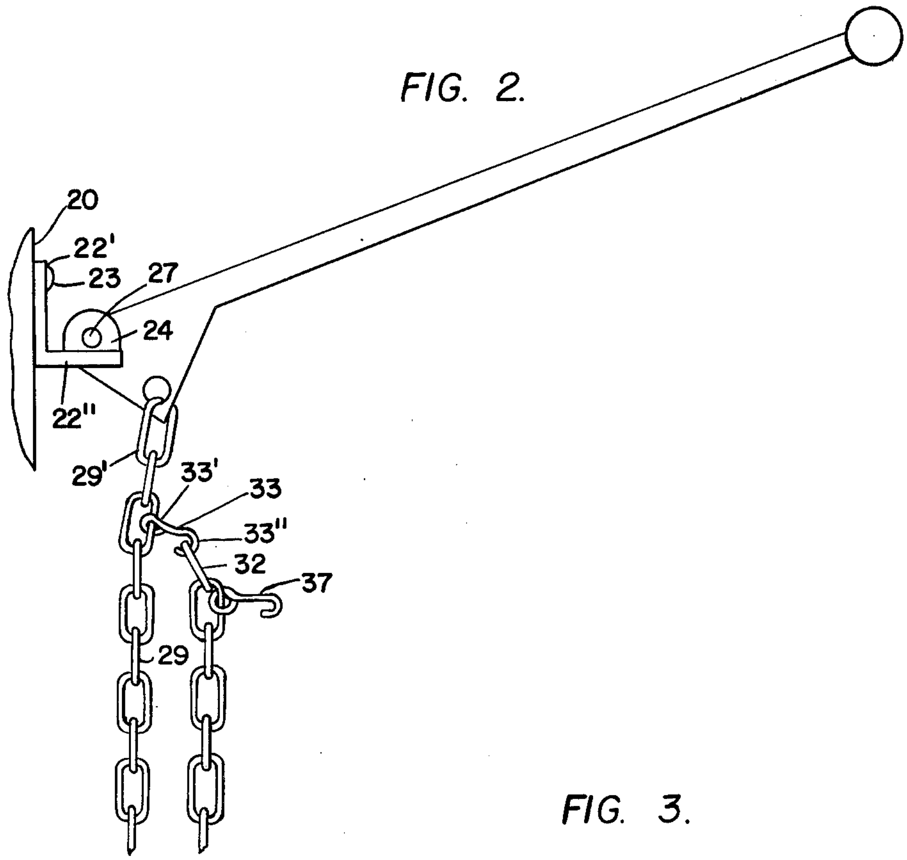
FIG. 2 is an enlarged side elevational view of the leverage device.
Figure 3:
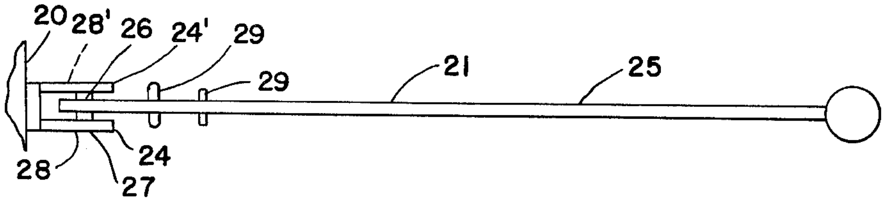
FIG. 3 is a top plan view of the leverage device.

Referring more particularly to the drawing in FIG. 1 the power drill 20 is illustrated with the leverage attachment 21 mounted to the drill. The leverage attachment 21 has an L-shaped bracket 22 with one leg 22″ having a bolt 23 to mount the one leg of the bracket to the power drill. The other leg 22″ has a pair of flanges 24 and 24′ fixed thereto. A lever arm 25 has a depending plates portion 25′ and an eyelet 26 in the plate. A pin 27 passes through a pair of eyelets 28 and 28′ in the flanges 24 and 24′ and through the eyelet 26 to pivotally mount the arm to the flanges of the bracket 22 about the axis of the pin 27.

A link chain 29 has one end 29′ attached to an eyelet 30 in the depending plate portion 25′ of the arm, and is adapted to extend around the material 31 to be drilled and the other end 32 of the chain is attached to the one end 29′ of the chain by a hook 33. The hook has an eyelet 33′ attached to a link at the one end 29′ of the chain and a C-shaped hook 33″ which hook is attached to selected links of the chain between the one end 29′ and the other end 32 of the chain to make or position the chain taut about the material when the power drill is in an operative position for drilling through the material, with the drill bit 20′ engaged against the material, as illustrated in FIG. 1.

The leverage attachment is operated by the operator grasping with one hand the piston grip 35 of the power drill 20 and grasping with the other hand the lever arm 25. The operator will energize the drill with one finger of his one hand upon the trigger 20″ to rotate the drill bit while pressing downward upon the pistol grip 35 of the drill with the other hand and at the same time with his other hand will pull the lever 25 upward in a counterclockwise direction from the position shown in FIG. 1. The material 31 is resting upon a rigid surface 31′, so that the pressing downward with the one hand upon the piston grip provides the normal downward force upon the drill bit 20′ for pushing the drill bit downward against the material to assist in the drilling of the hole in the material.

The upward counterclockwise lever movement of the lever arm 25 with his other hand acts to lever the power drill downward relative to the chain to provide an additional downward force upon the power drill, thereby providing an additional downward force upon the drill bit of the power drill to assist in drilling a hole into and through material.

The lever arm 25 by being relatively long, in excess of the length of the piston grip, and with the eyelet 30 being relatively close to the pivot point of the arm provided by pin 27, this provides a substantial downward leverage force upon the drill. The eyelet 30 being beneath the lever arm 25 also facilitates easy attachment of the chain to the lever arm. A second hook 37 may be mounted to the other end of the chain to facilitate hooking the chain about different objects.

The lever arm 25 can pivot upward from its position shown in solid lines to its position shown in phantom lines and beyond if desired until the lever arm becomes generally vertical and engages against the front side 20‴ of the drill which movement thereby provides the additional downward leverage force, for the distance in which the eyelet 30 moves from position 35 to position 36.

It it is desired to drill a hole entirely through the material and the thickness of the material is in excess of the distance between position 35 and 36. The power drill may be used to drill a hole that distance and the chain readjusted to a taunt position and the power drill used to drill the distance between position 35 and 36 and repeated again until the hole is drilled entirely through material.

It will be obvious that various changes and departures may be made to the invention without departing from the spirit and scope thereof and accordingly, it is not intended that the invention be limited to that specifically described in the specification or as illustrated in the drawing, but only as set forth in the appended claims wherein.

What is claimed is:

1. A leverage device adapted to be mounted to a power drill having front and rear sides, vertical drill bit and an elongated fixed grip extending in length horizontally in one direction rearward from said rear side of the drill, said leverage device having a bracket for mounting to the front side of a drill opposite the grip, said bracket having mounting means, an elongated lever arm, said elongated lever arm being pivotally mounted to the mounting bracket on the drill about an axis perpendicular to and spaced away from the longitudinal axis of the drill bit and extending across the front side of the drill to pivot upward and downward, said lever being elongated in length from its pivoted mounting in the forward direction opposite to the length of the grip, chain mounting means on said lever arm spaced near the pivot mounting in the forward direction along the lever arm, a link chain having one end attached to the chair fastening means on the lever arm, a hook along other end of the chain, whereby the other end of the chain may be extending about material to be drilled and the one end of the chain and the other end of the chain may be hooked together by the hook selectively hooked to a selected link at the one end of the chain to position the chain taut about the material, said lever being free of adjacent structure above and below during its movement and free to pivot upward and downward limited only by the chain, whereby the operator may push the power drill downward with one hand on the grip pushing the drill against the material and energizing the power drill with the one hand to rotate the drill bit, and may grasp the lever arm with the other hand to pivot the lever arm upward to raise the chain against the material to provide additional continuous leverage force downward upon the drill bit relative to the material, as the drill bit is drilling through the material.

* * * * *